United States Patent [19]
Kerfoot et al.

[11] 3,877,878
[45] Apr. 15, 1975

[54] ANALYTIC DEVICE AND METHOD FOR MONITORING HEAVY METALS IN NATURAL WATERS

[76] Inventors: William B. Kerfoot; Ralph F. Vaccaro, both of Woods Hole Oceanographic Institution, Woods Hole, Mass. 02543

[22] Filed: May 2, 1973

[21] Appl. No.: 356,375

[52] U.S. Cl. ............................................. 23/253 TP
[51] Int. Cl. ...................... G01n 31/06; G01n 33/18
[58] Field of Search ................................. 23/253 TP

[56] References Cited
UNITED STATES PATENTS

| | | | |
|---|---|---|---|
| 2,567,445 | 9/1951 | Parker | 23/253 TP X |
| 2,606,102 | 8/1952 | Cook | 23/253 TP X |
| 3,510,263 | 5/1970 | Hach | 23/253 TP |
| 3,715,192 | 2/1973 | Wenz et al. | 23/253 TP |
| 3,748,096 | 7/1973 | Schmitt | 23/253 TP X |

*Primary Examiner*—Robert M. Reese
*Attorney, Agent, or Firm*—Snyder, Brown and Ramik

[57] ABSTRACT

An analytical device comprises a layer of adsorptive material capable of adsorbing heavy metal ions in natural waters subjected to sources of pollution, which layer is sandwiched between a pair of porous membranes. The adsorptive material is activated charcoal which is pretreated with an organic agent having an aromatic functional group which adsorbs on the charcoal and another functional group which binds the heavy metal ions. The membranes have a selected degree of porosity which regulates the uptake of heavy metal ions from solution.

23 Claims, 6 Drawing Figures

ANALYTIC DEVICE AND METHOD FOR MONITORING HEAVY METALS IN NATURAL WATERS

BACKGROUND OF THE INVENTION

Live oysters may be used as analytical devices to detect and monitor the presence and amounts of heavy metals present in natural waters. However, these organisms present analytical difficulties which it would be desirable to overcome and in some instances they cannot be used at all wherein such monitoring is desirable. Since various materials are known which take up heavy metal ions from water, their use for analytical purposes is possible.

Broadly stated, an analytical device of the kind to which the present invention is directed should function to take up some known percentage of the total concentration of heavy metal ions per unit of time from natural waters which are polluted by metal contamination. On this basis, the device can be immersed in the water being monitored for a predetermined time after which it is removed from contact with the water so that subsequent laboratory testing to determine the amount of heavy metal ions taken up will be an indicator of the total concentration of the heavy metal in the natural water.

Unfortunately, materials which perform this type of function do not take up the heavy metal ions uniformly per unit of time and the total amount of heavy metal ions taken up is dependent upon the amount and binding power of material used. Moreover, such materials take up heavy metal ions in a non-linear manner during the initial period of exposure and thereafter take up additional ions so slowly that meaningful measurement of the total concentration of the heavy metal in the water is not possible.

BRIEF SUMMARY OF THE INVENTION

Accordingly, it is of primary concern in connection with this invention to provide what may be termed an artificial oyster for the purpose of providing an analytical device for monitoring heavy metals in natural waters wherein the uptake of heavy metal ions per unit of time is linear so that subsequent laboratory analysis of the device will provide the basis for determining the concentration of heavy metal or metals present in the natural waters being monitored.

Briefly stated, the present invention incorporates a mass of material which adsorbs or binds ions of one or more heavy metals, the layer being of known weight and encapsulated or contained within porous membrane means which is of inert or inactive material. This confined mass of material is used as an analytical device for monitoring heavy metals in natural waters by immersing the device in the water being monitored for a predetermined length of time, removing the device from the natural water environment and subsequently performing laboratory analysis to determine the weight of heavy metal taken up by the active material and from which the concentration of the heavy metal in the water easily may be calculated. By providing the arrangement as described, with the porous membrane means having porosity within a relatively narrow range, a linear relationship between time of immersion and the amount of heavy metal ion uptake can be obtained which is relatively independent of the temperature of the natural water within the temperature range normally encountered.

The combination of active material and porous membrane means thus not only provides the important function of linearity of heavy metal ions uptake and of relative immunity to water temperature, but also effects the unexpected result of making tht total amount of heavy metal taken up relatively independent of the amount of active material employed. In this way, the amount of active material used is not required to be controlled precisely. Instead, the porosity of the membrane means becomes the controlling factor so long as there is sufficient mass of active material within the membrane means as to accommodate for the total amount of water which diffuses or flows through the membrane means. In a method according to this invention, the device is immersed in a sample of the water being monitored, such sample being of selected volume, and the concentration of heavy metal in the water sample is determined from the immersion time, the weight of the heavy metal taken up by the active material, the volume of the water sample, and the porosity of the membrane means confinig the active material during immersion.

It is also possible to expose the device directly in the body of water being monitored provided that means for controlling the volume of water contacting the device during the exposure period is employed.

BRIEF DESCRIPTION OF THE DRAWING FIGURES

DETAILED DESCRIPTION OF THE INVENTION

Figure 1:
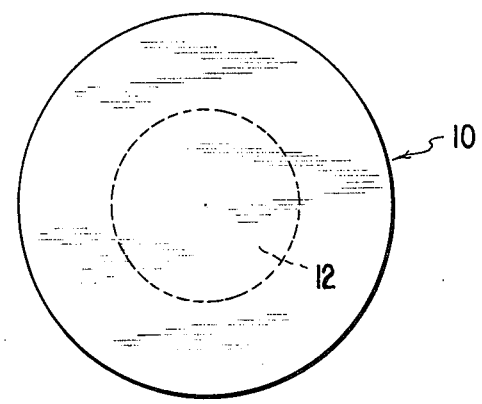
FIG. 1 is a plan view of an illustrative embodiment of the invention.

With reference to FIG. 1, the analytical device 10 illustrated therein may take the form of a water having a central portion 12 within which the active material is located and from which material the heavy metal utimately is recovered by standard laboratory techniques of which is otherwise analyzed to determine the amount of heavy metal uptake.

In 2, the device will be seen in detail to include a pair of sheets or membranes 14 and 16 having the active material 18 disposed in sandwiched relationship therebetween as a thin layer and with the sheets 14 and 16 being sealingly engaged in the area surrounding the layer 18 by means of a suitable sealing means 20. This sealing means may take many different forms as, for example, a quantity of paraffin such as is shown in the illustrative embodiment which seals and joins the peripheries of the sheets 14 and 16 in surrounding relation to the layer 18. Alternatively, other sealing means such as adhesives may be used. The sealing means also may simply be the heat bond effected between the sheets 14 and 16 as is conveniently used when the sheets are constructed of polyvinyl material.

The material 18 may be composed of different types of materials but it is preferred that this layer 18 be formed from finely divided activated charcoal which has been pretreated with an organic agent. In a preferred embodiment, the activated charcoal is of lignite or coconut origin, specifically Fisher's DARCO G-60 having a uniform particle size of between 100–125 microns. This material is heated in a muffle furnace at 650°C for one hour. The material is then admixed with a dilute solution of 8-hydroxyquinoline sulfate for 24 hours after which the solution is filtered, the charcoal recovered and then dried prior to introduction between the membranes 14 and 16 to form the layer 18. The membranes 14 and 16 are formed of polycarbonate material of 10 $\mu$m thickness having pores which are of a diameter uniformly of 3 microns; the mass of the active material is 10 mg; and the diameters of the membrane areas through which water may diffuse to contact the active material are 24 mm.

Other organic agents may be utilized provided they have two functional groups, an aromatic nucleus capable of adsorbing on the activated charcoal and a functional group which binds a heavy metal ion upon contact therewith. Examples of such latter functional groups are such groups as hydroxyl, carboxyl and amine groups or combinations thereof. Examples of tested organic agents include 8-hydroxyquinoline sulfate, phenylenediamine, phenylalanine, pyrocatecol and cupferron.

By combining the appropriate organic agent with the correct membrane, the wafer can be designed to collect specific metals at definite or definable rates.

Figure 2:
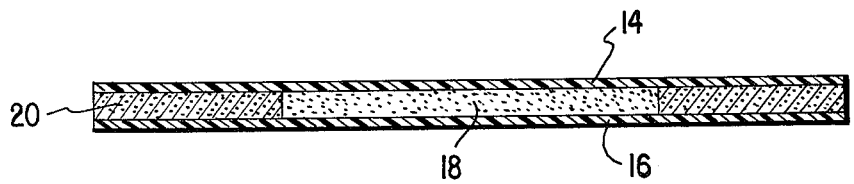
FIG. 2 is an enlarged cross sectional view of the device shown in FIG. 1.
Figure 3:
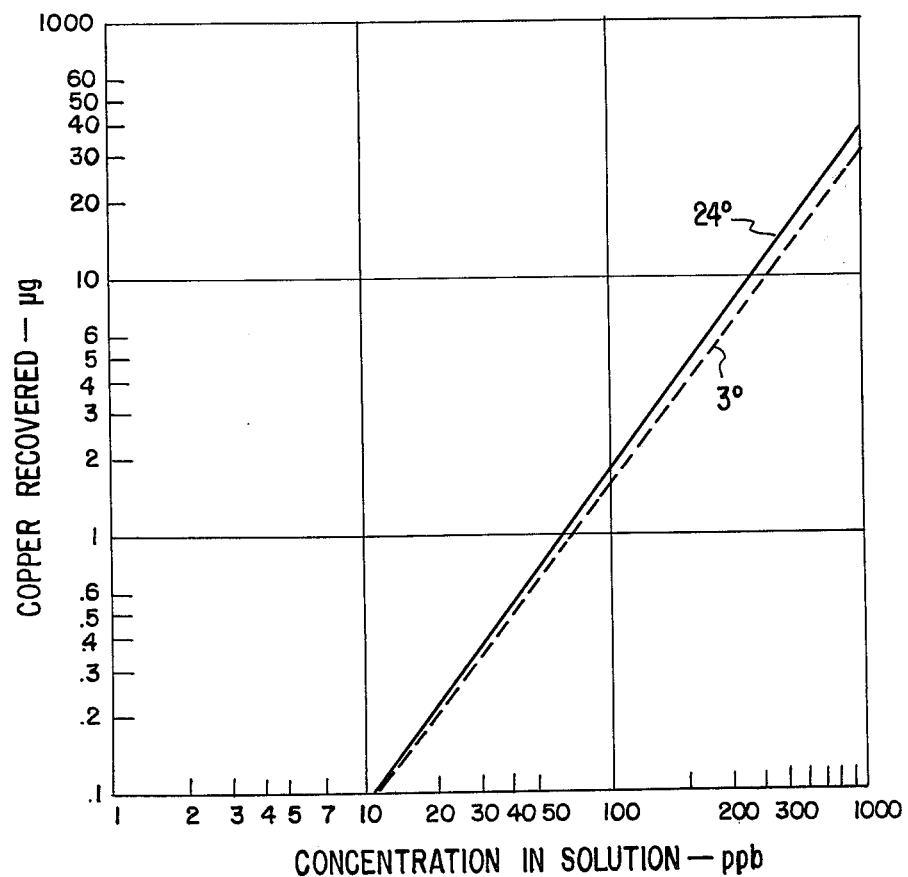
FIGS. 3–6 are graphs illustrating certain principles according to the present invention.

FIG. 3 shows results of tests performed with the preferred embodiment described above constructed in accordance with the configuration of FIGS. 1 and 2 and with the diameter of the layer 18 being 24 millimeters. The solution was distilled water having carefully controlled amounts of copper therein as indicated by abscissa of the graph and the copper recovered from the devices forms the ordinate of the graph. The graph is plotted on log-log paper and the tests were conducted at temperature extremes of 3°C and 24°C. In each series of tests, the uptake of copper on the material 18 was slightly less than 4 percent of the amount in solution and the two lines drawn for the temperatures involved are adjusted such that the accuracy of precision for all points in each series of tests is within the range of ± 20 percent. It will be manifest from FIG. 3 that the two lines lie so closely together that for all practical purposes the results are independent of the temperature within the range of about 3°C to about 24°C which represents the extremes of the temperature range which normally would be encountered during tests. If the temperature variation were otherwise substantially different from that shown, the temperature of the natural water would have to be continuously recorded and closely monitored and, if substantial variation occurs, extrapolation of the results would be required. However, with the substantial independence of results within the temperature range specified, the natural water temperature need not be monitored nor will variations therein during the tests submit the results to any substantial error.

For the above tests indicated in FIG. 3, the copper recovered was eluted with 5 milliliters of 50 percent nitric acid per 10 mg of the active material 18 and the acid solution is then analyzed by standard atomic absorption spectrophotometry. Elution may also be accomplished with from 1 to 5 ml of a 20 percent solution of hydrochloric acid.

Figure 4:
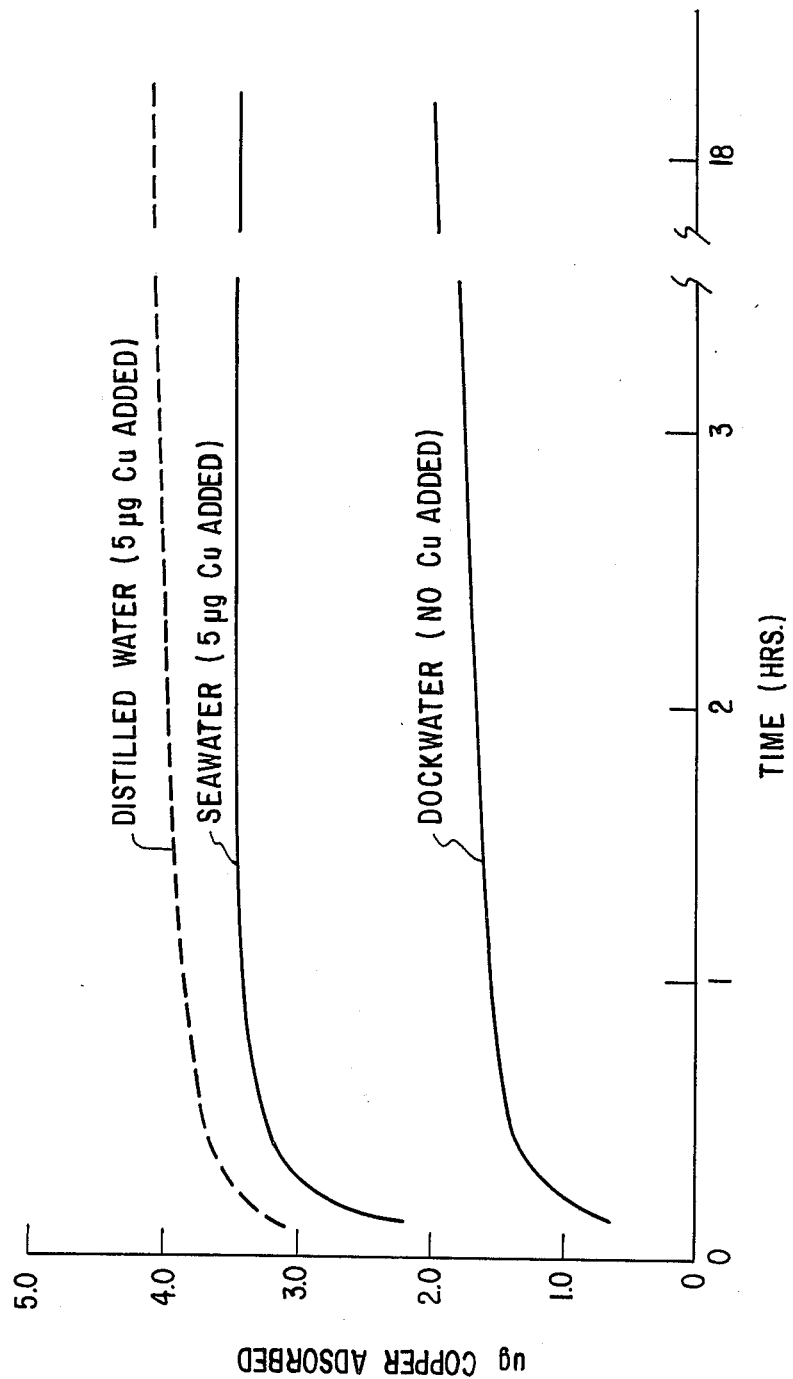

FIG. 4 is a graph illustrating the non-linear uptake exhibited by 10 mg of activated carbon pre-treated with 8-hydroxyquinoline sulfate and exposed directly to the contaminated water. As can be seen, the initial uptake is very rapid and non-linear whereas after this initial time period the material is essentially saturated so that, at best, very little additional uptake is exhibited even after the extended time period of 18 hours as shown.

Figure 5:
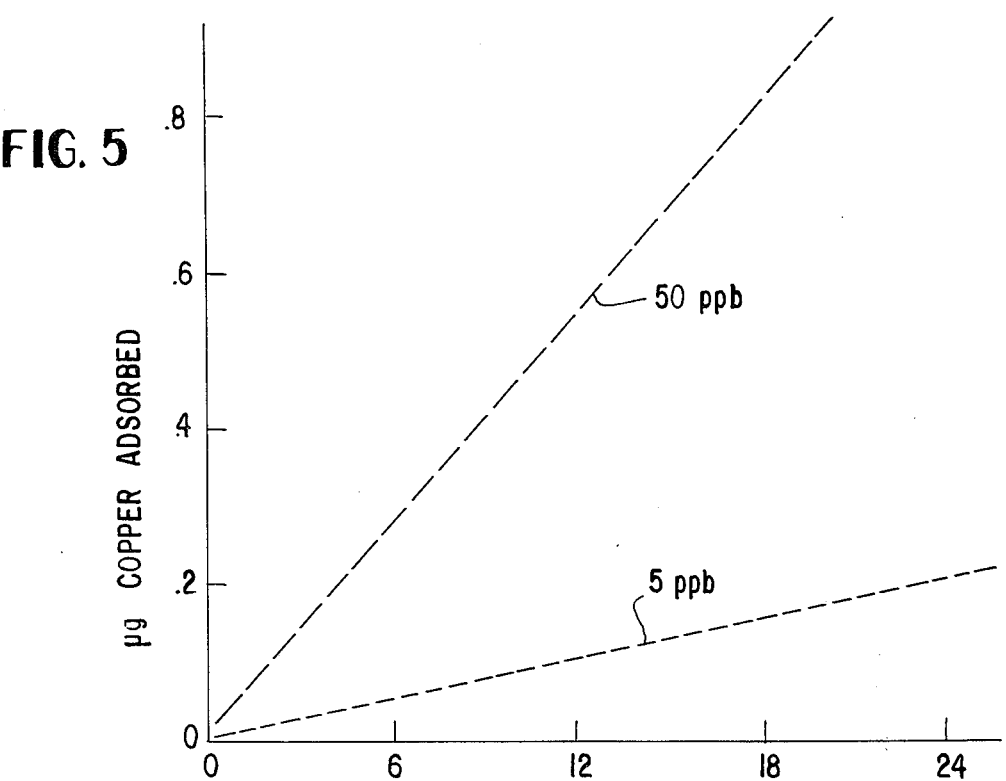

In contrast, by containing the 10 mg of pre-treated activated carbon between Nucleopore polycarbonate membranes having average pore size of 3 $\mu$, the linear uptake illustrated in FIG. 5 is obtained. As can be seen, even in the controlled water sample containing a total concentration of only 5 ppb of copper, the slope of the uptake line is sufficient to allow meaningful calculation of the total concentration. For the controlled water sample containing 50 ppb copper, the slope is greater as shown.

Figure 6:
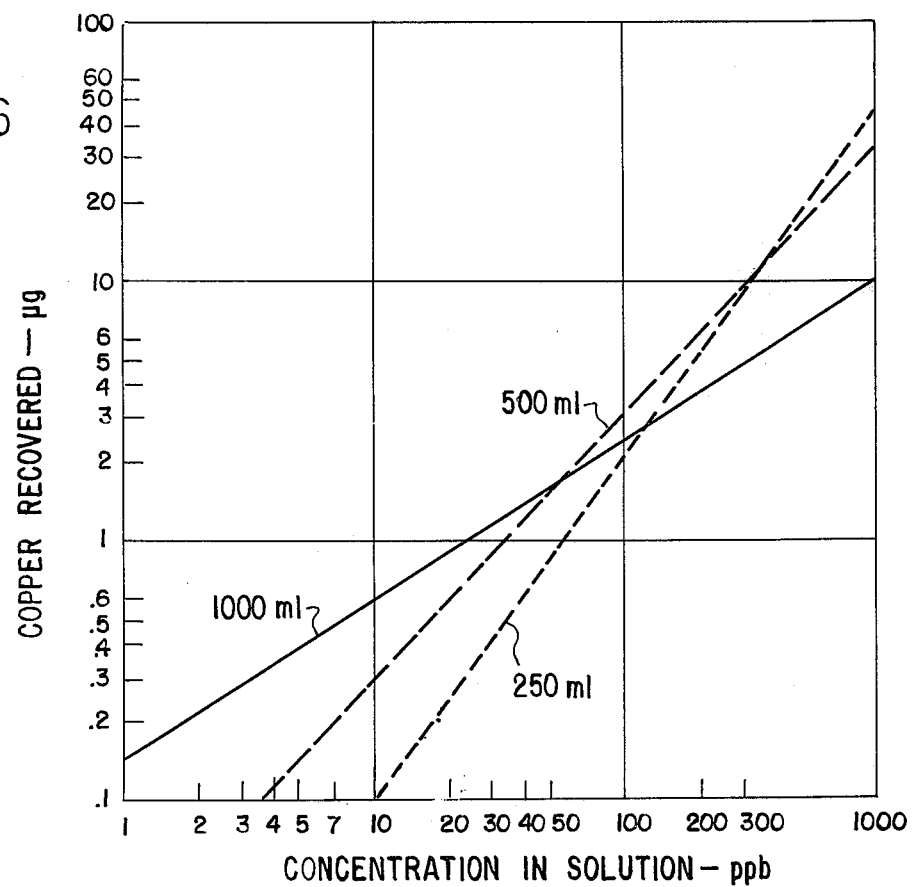

FIG. 6 illustrates the effect of varying the volume of the water sample with respect to the mass of the pre-treated activated carbon. As can be seen, as the volume of the water sample is increased, the line slopes of FIG. 5 will vary although they will be linear in all cases. The data shown in FIG. 6 were obtained based upon exposure time of 24 hours, 24°C water temperature, and using 10 mg of activated carbon pre-treated with 8-hydroxyquinoline sulfate and enclosed between Nucleopore polycarbonate membranes of 3 $\mu$ porosity.

The relationship among the parameters involved for FIG. 6 may be expressed empirically as follows:

$R = p^2 \, e^x \, C^y \, t, /216$ where:

R = micrograms of copper removed from solution
$p$ = pore diameter in microns ($\mu$)
C = initial copper concentration in parts per billion (ppb)
$t$ = time of exposure in hours
$e$ = base of natural logarithms
$x = -990/0.434(V+160)$
$y = 840/V+360$
V = Volume of water sample.

Similar expressions may be developed for other heavy metals and for other pre-treatment agents. The following table illustrates several pre-treatment agents and several heavy metals based upon a device as used for the data of FIG. 6 following exposure of 24 hours to a one liter water sample at 24 °C and having a concentration of 50 ppb of the identified heavy metal.

|  | Cu | Ni | Zn | Cd |
| --- | --- | --- | --- | --- |
| 8-hydroxyquinoline | 3.2 | 1.8 | 1.0 | 2.0 |
| Cupferron | 2.6 | 2.2 | 1.9 | 1.4 |
| Phenylenediamine | 2.2 | 0.8 | 0.6 | 0.5 |

The selection of the pre-treating organic agent depends upon:
1. the heavy metal being monitored;
2. the porosity of the membrane means which confines or encapsulates the mass of active material;
3. the sample volume employed; and
4. a sufficiently great slope as depicted in FIG. 5 to permit a meaningful calculation of the heavy metal concentration within the immersion time period.

Optimizing the wafer to collect copper from a batch system, where the wafer is held unstirred in a closed container, some approximate limits of range for the different variables can be generated. The range of the mass of carbon could be from 1 mg to 100 mg, although 10 mg is ideal. The porosity (based on polycarbonate membranes) could range from 0.1 $\mu$ (which would yield about 0.03 $\mu$g copper following 24 hrs of uptake at 20 ppb, about the limit of detection by atomic absorption) to a maximum of 15 $\mu$ (which would show saturation effects in 24 hrs). The ideal volume for extraction seems to be 1000 ml for copper, but would vary with the metal of interest. At 1,000 ml exposure, the copper uptake is linear on log-log plots from 1 to 1,000 ppb, an important range including most natural concentrations found in seawater and freshwater as well as domestic drinking waters. The time of 24 hours is taken as convenient.

For example, using 10 mg of activated carbon pretreated with 8-hydroxyquinoline sulfate enclosed within polycarbonate membrane means having 3 $\mu$ porosity and with a layer 18 diameter of 24 mm, an exposure time of 24 hours and extracting from a 1,000 ml solution, the equation given above reduces to:

$$R = .14C^{.62}.$$

As set forth above, the presently preferred technique is to confine the device for a predetermined time in a selected volume of the water being monitored. In this instance, the water merely diffuses through the membrane means so as to control the volume of water contacting the active material during the period of immersion. The mass of active material used is not critical except to the extent that it should be sufficient to avoid saturation within the time period of immersion. However, the invention is not limited to this technique for it is possible to achieve the results of this invention in other ways. For example, a device as herein may be disposed in a chamber detailed in design to allow a controlled flow of water past the device. Such an assembly may be placed directly in a moving body of water being monitored to achieve a linear uptake of heavy metal ions as described above. In this instance, the volume of water contacting the active material during the monitoring period, although controlled, is greater than that which results from immersion in a water sample. Thus, for this type of system, a correspondingly greater minimum mass of active material must be used in order to avoid saturation with heavy metal within the monitoring period.

What is claimed is:

1. An analytical device for monitoring the presence of heavy metals in natural waters subject to sources of pollution, comprising in combination:
    first and second sheets of porous material and a layer of porous adsorptive material sandwiched between said first and second sheets;
    sealing means joining said first and second sheets in completely surrounding relation to said layer of adsorptive material whereby the natural water may reach said layer only by passage through at least one of said first and second sheets; and
    said layer of adsorptive material consisting of activated charcoal impregnated with an organic agent having two functional groups, one of which groups is an aromatic nucleus which adsorbs readily on said activated charcoal and the other of which groups binds ions of at least one selected heavy metal which is to be monitored.

2. An analytical device according to claim 1 wherein said organic agent is 8-hydroxyquinoline sulfate.

3. An analytical device according to claim 1 wherein said organic agent is cupferron.

4. an analytical device according to claim 1 wherein said organic agent is phenylenediamine.

5. An analytical device according to claim 1 wherein said first and second sheets are of polycarbonate material and have pores which are in the range of about 0.1 microns to about 15 microns.

6. An analytical device according to claim 1 wherein said first and second sheets are of polyvinyl material and said sheets are heat bonded to provide said sealing means.

7. An analytical device for monitoring the presence of heavy metals in natural waters subject to sources of pollution, comprising:
    a sandwich construction comprising a pair of porous sheet members each having pores ranging in diameter from about 0.1 to about 15 microns, and a layer of material capable of taking up ions of at least one heavy metal disposed between said sheets, said sheets being sealingly joined in circumscribing relation to said layer of material whereby water being monitored must pass through said sheets to reach said layer of material.

8. An analytical device for monitoring the presence of heavy metals in natural waters subject to sources of pollution, comprising in combination:
    first and second sheets of porous material and a mass of porous adsorptive material disposed between said first and second sheets; and
    sealing means joining said first and second sheets in completely surrounding relation to said layer of adsorptive material whereby the natural water may reach said layer only by passage through said sheets;
    said mass of adsorptive material being effective to bind ions of at least one selected heavy metal which is to be monitored and the porosity of said sheets being such as to permit said mass of material to adsorb ions of said selected heavy metal linearly over a protracted period of time.

9. An analytical device according to claim 8 wherein said first and second sheets are of polycarbonate material and having pores which are in the range of about 0.1 micron to about 15 microns whereby to create a linear uptake of metal and to render the device substantially independent of the temperature of the natural water at least within the range of 3°–24°C.

10. Analytical device according to claim 8 wherein said first and second sheets are of polyvinyl material and said sheets are heat bonded to provide said sealing means.

11. An analytical device for monitoring water which may be contaminated with a heavy metal, comprising in combination;
    a predetermined mass of material which rapidly and non-linearly adsorbs ions of said heavy metal from water contaminated with such heavy metal; and
    membrane means encapsulating said mass of material for causing said mass of material linearly to adsorb said heavy metal ions.

12. An analytical device as defined in claim 11 wherein said material is activated carbon impregnated with an organic agent which adsorbs readily on said activated carbon and binds ions of said heavy metal.

13. An analytical device as defined in claim 12 wherein said organic agent is 8-hydroxyquinoline sulfate.

14. An analytical device as defined in claim 12 wherein said organic agent is cupferron.

15. An analytical device as defined in claim 12 wherein said organic agent is phenylenediamine.

16. The method of monitoring water which is subject to pollution by a heavy metal, which comprises the steps of:
   a. encapsulating a selected mass of material which rapidly and non-linearly binds ions of said heavy metal in a porous envelope having a porosity which allows said material linearly to take up said ions during at least a selected time period;
   b. contacting said encapsulated material with a controlled volume of the water being monitored and then terminating such contact after a selected time period not greater than the time period specified in step (a);
   c. determining the weight of heavy metal taken up by said mass of material; and
   d. determining the concentration of the heavy metal in the sample of step (b) from the weight determined in step (c), the selected contact period of step (b), the controlled volume of step (b), and the selected mass of step (a).

17. The method as defined in claim 16 wherein the contacting of step (b) is effected in an isolated sample of said water, said sample being of a size to equal said controlled volume.

18. A device according to claim 1 wherein said other group is selected from the group consisting of hydroxyl, carbonyl, amine and mixtures therof.

19. A device according to claim 1 wherein said organic agent is selected from the group consisting of 8-hydroxyquinoline sulfate, phenylenediamine, phenylalanine, pyrocatecol and cupferron.

20. A device as defined in claim 7 wherein said material comprises activated charcoal impregnated with an organic agent selected from the group consisting of 8-hydorxyquinoline sulfate, phenylenediamine, phenylalanine, pyrocatecol and cupferron.

21. A device as defined in claim 8 wherein said material comprises activated charcoal impregnated with an organic agent selected from the group consisting of 8-hydroxyquinoline sulfate, phenylenediamine, phenylalanine, pyrocatecol and cupferron.

22. A device as defined in claim 11 wherein said material comprises activated charcoal impregnated with an organic agent selected from the group consisting of 8-hydroxyquinoline sulfate, phenylenediamine, phenylalanine, pyrocatecol and cupferron.

23. The method according to claim 16 wherein said material comprises activated charcoal impregnated with an organic agent selected from the group consisting of 8-hydroxyquinoline sulfate, phenylenediamine, phenlalanine, pyrocatecol and cupferron.

* * * * *